(12) United States Patent
Shah (10) Patent No.: US 12,438,740 B1
(45) Date of Patent: *Oct. 7, 2025

(54) SYSTEM AND METHOD OF MANAGING AN ONLINE COMMUNICATION GROUP

(71) Applicant: Sandeep Navinchandra Shah, Northborough, MA (US)

(72) Inventor: Sandeep Navinchandra Shah, Northborough, MA (US)

(73) Assignee: Sandeep Navinchandra Shah, Northborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/815,107

(22) Filed: Aug. 26, 2024

(51) Int. Cl.
*H04L 12/18* (2006.01)
*H04L 9/40* (2022.01)
*H04L 67/52* (2022.01)

(52) U.S. Cl.
CPC .......... *H04L 12/1818* (2013.01); *H04L 63/10* (2013.01); *H04L 67/52* (2022.05)

(58) Field of Classification Search
CPC ....... H04L 63/10; H04L 51/04; H04L 67/535; H04L 51/00; H04L 51/56
See application file for complete search history.

(56) References Cited

U.S. PATENT DOCUMENTS

| | | | |
|---|---|---|---|
| 9,432,379 B1* | 8/2016 | Roche | H04L 63/08 |
| 9,558,341 B1* | 1/2017 | Allababidi | G06F 21/45 |
| 10,216,709 B2 | 2/2019 | Lane et al. | |
| 10,454,934 B2* | 10/2019 | Parimi | G06N 20/00 |
| 10,509,531 B2 | 12/2019 | Sharifi et al. | |
| 11,190,474 B2 | 11/2021 | Bezina et al. | |
| 11,374,890 B2 | 6/2022 | Lee et al. | |
| 11,431,665 B1* | 8/2022 | Ali | H04L 12/1822 |
| 11,848,905 B1* | 12/2023 | Shah | H04L 51/046 |
| 12,149,531 B2* | 11/2024 | Burckhardt | H04W 12/08 |
| 2003/0078932 A1* | 4/2003 | Kaiserwerth | G06F 16/25 |
| 2007/0150300 A1* | 6/2007 | Fukazawa | G06F 16/9535 |
| | | | 705/347 |
| 2008/0091761 A1* | 4/2008 | Tsao | H04L 51/04 |
| | | | 709/201 |
| 2008/0133530 A1* | 6/2008 | Wang | G06F 21/6218 |
| | | | 707/E17.135 |
| 2009/0177641 A1 | 7/2009 | Raghaven | |
| 2011/0209069 A1* | 8/2011 | Mohler | H04M 1/72457 |
| | | | 715/744 |

(Continued)

*Primary Examiner* — David R Lazaro
(74) *Attorney, Agent, or Firm* — Jason A. Smith; Shumaker, Loop & Kendrick, LLP (57) ABSTRACT

Disclosed is a system and a method of managing an online communication group. The method comprises receiving user data of a user from a list of users in the online communication group. The user data may comprise one or more existing communication groups, and user rights data from the one or more existing communication groups of the user. Further, the method comprises tracking location of the user. Furthermore, a change in user mode of the user is determined based on the location. Subsequently, the method comprises determining a role of the user based on at least one of the user mode and the user data. Further, the role of the user is adjusted based on the change in the user mode and the user data. Subsequently, the user is granted access to an information database based on an adjusted role of the user.

14 Claims, 3 Drawing Sheets

(56) References Cited

U.S. PATENT DOCUMENTS

| | | | |
|---|---|---|---|
| 2013/0282365 A1* | 10/2013 | Van De Ven | G06F 40/253 |
| | | | 704/9 |
| 2016/0255086 A1* | 9/2016 | Vajravelu | H04L 63/101 |
| | | | 726/4 |
| 2020/0007411 A1* | 1/2020 | Arar | G06F 8/31 |
| 2020/0175112 A1* | 6/2020 | Dunne | H04L 51/216 |
| 2020/0320130 A1* | 10/2020 | Korpman | G06F 40/295 |
| 2021/0160201 A1* | 5/2021 | Phan | H04L 51/04 |
| 2022/0103566 A1* | 3/2022 | Faulkner | H04L 67/06 |
| 2022/0166763 A1* | 5/2022 | Hong | H04L 67/10 |
| 2022/0230639 A1 | 7/2022 | Hewitt et al. | |
| 2022/0337541 A1* | 10/2022 | Rieseberg | H04L 63/104 |
| 2023/0325735 A1* | 10/2023 | Torstensen | G06Q 10/101 |
| | | | 705/7.17 |
| 2023/0412604 A1* | 12/2023 | Pierce | H04L 63/20 |
| 2024/0169085 A1* | 5/2024 | Soni | G06F 21/6227 |

* cited by examiner

SYSTEM AND METHOD OF MANAGING AN ONLINE COMMUNICATION GROUP

PRIORITY INFORMATION

The present application does not claim a priority from any other application.

TECHNICAL FIELD

The present subject matter described herein, in general, relates to the field of online communication groups and, more particularly, to creation of an online communication group using details of existing communication groups.

BACKGROUND

Modern communication techniques have eased the life of users by providing different modes of communication, such as calls, messages, instant messages, and emails. Sharing of instant messages over an online communication group is the mode that is widely accepted by the users over all other modes. Instant messages are widely preferred because they do not require the establishment of communication sessions which are required for placing calls, entering user/destination details which are required in emails, and don't have any word limit for sharing information which is generally present in messages. A user can quickly write an instant message and send it to one or more users merely by selecting their names in an online communication group.

A key challenge associated with the conventional online communication groups includes the complexity associated with their creation and the limited facilities over them. Further, a significant amount of time is consumed in the creation of specialized groups that need to be available quickly to maintain short-term or long-term channels for secure, real-time information. Several features, for example assigning different access rights to different users, and obtaining cumulative responses from the users, aren't available over the conventional online communication groups. Therefore, an online communication group/platform which can solve these challenges is desired.

SUMMARY

Before the present systems and methods of managing an online communication group are described, it is to be understood that this application is not limited to the particular systems, and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application.

This summary is provided to introduce aspects related to a system and a method of managing an online communication group. This summary is not intended to identify essential features of the claimed subject matter, nor is it intended for use in determining or limiting the scope of the claimed subject matter.

In one implementation, a system for managing an online communication group is disclosed. The system comprises a processor and a memory coupled to the memory. The memory stores programmed instructions executable by the processor. The system may receive user data of a user from a list of users in the online communication group. The user data may comprise one or more existing communication groups, and user rights data. The user rights data may comprise access rights, user management rights, and sharing rights of a user from the list of users in the one or more existing communication groups. Further, the system may track location of the user continuously using at least one of Global Positioning Service (GPS), Cellular Network Triangulation, and Wireless Fidelity (Wi-Fi) Positioning. Furthermore, a change in user mode of the user is determined based on the location of the user. Subsequently, the system may determine the role of the user based on the user mode and the user data. The role may be one of a monitor, an admin, and a member. Furthermore, the system may adjust the role of the user based on the change in the user mode and the user data. Subsequently the system may grant access to an information database, to the user, based on adjusted role of the user. The information database is linked to the online communication group.

In another implementation, a non-transitory computer program product embodying a computer program for managing an online communication group is disclosed. The computer program product (program) may comprise a program code for receiving user data of a user from a list of users in the online communication group. The user data may comprise one or more existing communication groups, and user rights data from the one or more existing communication groups of the user. The user data may comprise one or more existing communication groups, and user rights data. The user rights data may comprise access rights, user management rights, and sharing rights of a user from the list of users in the one or more existing communication groups. The program may comprise a program code for tracking location of the user using at least one of Global Positioning Service (GPS), Cellular Network Triangulation, and Wireless Fidelity (Wi-Fi) Positioning. Furthermore, the program may comprise a program code for determining a change in user mode of the user based on the location of the user. Subsequently, the program may comprise a program code for determining a role of the user based on at least one of the user mode and user data. The role may be one of a monitor, an admin, and a member. The program may comprise a program code for adjusting the role of the user based on the change in the user mode and the user data. Further to adjusting the role of the user, the program may comprise a program code for granting access of an information database, to the user, based on adjusted role of the user. The information database may be linked to the online communication group.

BRIEF DESCRIPTION OF THE DRAWINGS

The foregoing detailed description of embodiments is better understood when read in conjunction with the appended drawings. For the purpose of illustrating of the present subject matter, an example of construction of the present subject matter is provided as figures; however, the invention is not limited to the specific method and system disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Although any system and method of managing an online communication group, similar or equivalent to those described herein can be used in the practice or testing of embodiments of the present disclosure, the exemplary, methods and systems for managing an online communication group are now described. The disclosed embodiments for managing an online communication group are merely examples of the disclosure, which may be embodied in various forms.

Various modifications to the embodiment will be readily apparent to those skilled in the art and the generic principles herein may be applied to other embodiments for managing an online communication group. However, one of ordinary skill in the art will readily recognize that the present disclosure for managing an online communication group is not intended to be limited to the embodiments described but is to be accorded the widest scope consistent with the principles and features described herein.

Figure 1:
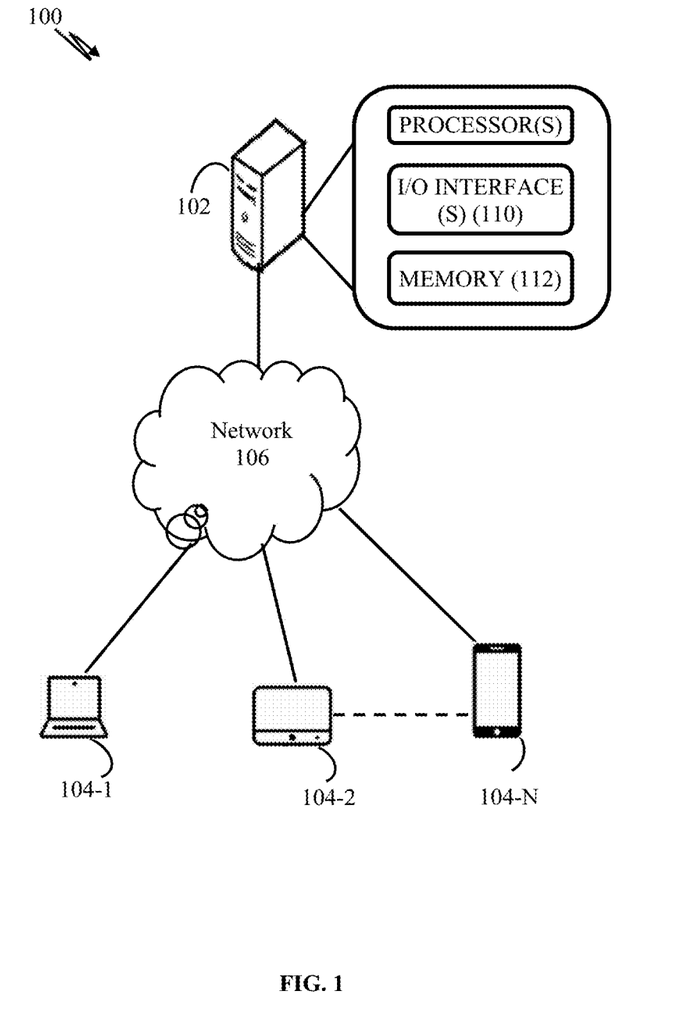
FIG. 1 illustrates a network connection diagram of a system for managing and hosting an online communication group, in accordance with an embodiment of the present subject matter.

Referring now to FIG. 1, a network implementation 100 of a system 102 for managing an online communication group is disclosed. It may be noted that one or more users may access the system 102 through one or more user devices 104-1, 104-2 . . . 104-N, collectively referred to as user devices 104, hereinafter, or applications residing on the user devices 104.

Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. It will be understood that the system 102 may be accessed by multiple users through one or more user devices 104-1, 104-2 . . . 104-N. In one implementation, the system 102 may comprise the cloud-based computing environment in which the user may operate individual computing systems configured to execute remotely located applications. Examples of the user devices 104 may include but are not limited to, a portable computer, a personal digital assistant, a handheld device, and a workstation. The user devices 104 are communicatively coupled to the system 102 through a network 106. In another implementation, the system 102 may be implemented on a user device 104 as a stand-alone system.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

In one embodiment, the system 102 may include at least one processor 108, an input/output (I/O) interface 110, and a memory 112. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random-access memory (SRAM) and dynamic random-access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

In operation, for managing an online communication group, a user may use the user device 104 to access the system 102 via the I/O interface 110. The user may register the user devices 104 using the I/O interface 110 in order to use the system 102. In one aspect, the user may access the I/O interface 110 of the system 102.

The present subject matter describes the system 102 for managing an online communication group. The system may comprise a memory configured to store programmed instructions and a processor. The processor may be operatively coupled to the memory. The system may include a server configured to obtain a request and necessary information for creation of the online communication group. The server may include a group of data processing elements or different servers treated collectively as a single server for ease of explanation. Functions required to be performed for managing and hosting the online communication group and performing related activities would be distributed across the data processing elements. A load balancing algorithm may be executed on the data processing elements for their even utilization. The server may obtain the request from an administrator responsible for creation and management of the online communication group. Through the request, the administrator may provide a list of users and user data. The list of users may comprise one or more users to be added to the online communication group. The users may be employees of an organization. The term organization used at several places throughout this document refers to a collection of users associated with a designated function, such as a company, a clinic, a hospital, and a healthcare agency.

In an embodiment, the system may receive identities of the users. The identities may be any of phone numbers, email IDs, or web links of their existing communication groups. The existing communication groups may be any of Buzz Medical Messenger®, Whatsapp™, Telegram™, Signal™, Facebook™, or any other. Each of the existing communication groups may be hosted over one or more dedicated servers. When the identities of the users required to be added within the online communication group are obtained, the system may connect with a server for obtaining details of the users. Using the details of the users, the server may add the users to the online communication group. In this manner, the system may create the online communication group and add the users to the online communication group, without seeking a lot of details from the users and making the users go through a time-consuming process. The system may be configured to monitor occurrence of certain triggering events. Upon determining occurrence of any such event, the system may perform one or more related actions such as adding a user to the online communication group and removing a user from the online communication group.

The system may also be connected with a communication infrastructure for providing Fax service, telephone service, SMS service, and other communication services. Further, the system may be connected with a configuration database. The configuration database may correspond to a single multiple data storage hardware elements configured to store configuration settings, data of incoming requests, and outgoing data related to different services offered by the server.

The online communication group may serve as a proxy for a purpose or association with a person such as a patient or a doctor, a resource such as a clinic or an operating room, or a project such as a patient surgery activity from intake to discharge.

The present subject matter discloses a system 102 for managing an online communication group. The system may receive a list of users and user data from an admin upon receiving a request to create the online communication group from the admin. The user data may comprise details of one or more existing communication groups. The one or more existing communication groups may include at least one of groups corresponding to an organization, groups selected by the admin, and groups that users from the list of users are a part of. Further, the user data may also comprise user rights data for the one or more existing communication groups. The user rights data may include user management rights, access rights information, and sharing rights of the users in the respective one or more existing communication groups. The user management rights may include permissions such as allowing a user to remove another user from an existing communication group, add a user to the existing communication group, change user rights for a user in the existing communication group. The access rights information may include data regarding which messages or information shared in the existing communication group can be accessed by a user from the existing communication group. The sharing rights may include permissions allowing a user to send a message or share information on the existing communication groups. The user rights data may be specified by an admin of the respective one or more existing communication groups.

In an embodiment, one or more existing communication groups and the online communication group may be linked to an organization and the online communication group may have a purpose for an organization. Further, the admin may be at least one of a system-controlled virtual admin, and a human. In one of the embodiments, the system-controlled admin may operate using a machine learning algorithm. The machine learning algorithm may be trained to share user data for users in the list of users. The list of users may be received from a database of the organization. The database of the organization may comprise an organization structure. The organization structure may include the list of users (employees of the organization) and status of the users. The status of the users may be active or inactive. The user having an inactive status may be a user removed from the organization. The user rights data may be determined based on the purpose of the online communication group and an identity of users in the organization. The identity of users may be fetched from a database of the organization. The identity of users may include a name, contact details, and employment details. The machine learning algorithm may be trained using a training data comprising a plurality of organizations, a plurality of existing communication groups of the organization, identities of the plurality of users in the plurality of existing communication groups, purposes of the corresponding plurality of existing communication groups, and corresponding user data of the users in the plurality of existing communication groups.

Further to receiving the list of the users and the user data, the system may determine the role of a user from the list of users. The role may indicate duties or responsibilities of the users. The role may be at least one of a monitor, a manager, an admin, a member, and a nonmember. In an embodiment, the system may analyze identities of the users and validate the identities and then determine the role. In an example, the system may assign the role nonmember to a user when the user is removed from the organization. In another example, the system may assign the role admin, for the online communication group, to a user when the user is an admin in the one or more existing communication groups or when the users in the list of users vote for the user to be the admin. In another example, the system may assign the role manager to a user when the user is an admin in the one or more existing communication groups but the admin role is already assigned to a user in the online communication group.

Subsequently the system may add a set of users from the list of users to the online communication group based on the role of one or more users from the list of users. For example, the list of users may comprise ten users. Two users of the list of users may have the role monitor, another two users from the list of users may have the role admin, four users may have the role member, and two users may have the role nonmember. In the example, the system may not add two users having the role nonmember to the online communication group. Further, the system may not add one user having the role admin out of the two users having the role admin to the online communication group.

The set of users may comprise at least one user from the list of users. In an embodiment, a user from the set of users may be assigned the role of an admin. In another embodiment, an automated admin system may be included in the online communication group as the admin. In an embodiment, the user assigned the role admin may manage the online communication group manually using one or more controls from the user interface. In another embodiment, the automated admin system may use a machine learning algorithm trained to manage the online communication group. The system 102 may use the admin to manage the online communication group by adjusting the role of a user in the online communication group, modifying the user data, and linking one or more information databases to the online communication group.

In an embodiment, the machine learning algorithm may adjust the role of a user based on a user mode, a user location, and a schedule. The user mode may be determined using at least one of an Internet Protocol (IP) address of a device used by the user, one or more sensors in the device used by the user including a gyro-meter, a location sensor, and the like. The user mode may be any one of "in office," "driving," "away from office," and the like. The system may adjust the role of the users based on the user mode. For example, a user may be assigned the role monitor only when the user mode is "in office." Consider another example, a user may be assigned the role of admin only when the location of the user is within a predefined set of location coordinates.

In an embodiment, the system may adjust the role of the user to member when the user mode changes from "in office" to "driving." In an embodiment, the system may adjust the role based on a predefined matrix comprising alternate users for the role. In another embodiment, the system may determine a substitute for the role based on the user mode of other users in the set of users, the user location of other users in the set of users, and the schedule of role assignment. The schedule may comprise instructions for assigning the role to one or more users from the set of users, and wherein the instructions may comprise at least one of a time and the role for the corresponding one or more users. In an embodiment, the schedule may be updated dynamically based on adjustment of the role.

In an embodiment, the role of the user may be adjusted when an activity is detected. The activity may occur in the one or more existing communication groups. The activity may be at least one of removal of one or more users of the set of users from the one or more existing communication groups, addition of one or more users in the one or more existing communication groups and change in the user rights data of one or more users in the one or more existing communication groups.

In an embodiment, the machine learning model is developed by applying a machine learning algorithm to a given training dataset. The machine learning model may be trained using a training dataset of a plurality of online communication groups, data comprising existing communication groups, user data and role of the users in the plurality of online communication groups, activities in the existing communication groups over a time period, a plurality of user modes, user locations of the users in the plurality of online communication groups over the time period, and corresponding adjustments in the role of the users over the time period.

Further to adjusting the role of the users, the system may modify the user data based on at least one of the role of the one or more users and an admin recommendation. The user data may be modified by updating the existing communication groups by adding the online communication group to the existing communication groups. Further, the user rights data may be defined for the online communication group based on the role and the adjustment of the role of the one or more users. The admin recommendation may include at least one of accepting, rejecting, and modifying the role of the one or more users after the role of the one or more users is adjusted. The admin recommendation may be received from the user assigned the admin role. In another embodiment, the admin recommendation may be received from the automated admin system. The automated admin system may use a machine learning algorithm to generate the admin recommendation. The machine learning algorithm may be trained using a training data comprising a plurality of online communication groups, data regarding adjustment of the role of users in the plurality of online communication groups, corresponding admin recommendations received from the user assigned the admin role in the plurality of online communication groups. The machine learning algorithm may be trained using recursive learning techniques by providing the admin recommendations as feedback to the machine learning algorithm.

The user rights data may be defined as a level of permission granted to a user. In an embodiment, the level of permissions granted may be a number between one and ten. The level zero may indicate no permission and the level ten may indicate complete permission. For example, a user with level 10 access rights may be able to view messages from all users in the online communication group and a user with level 5 access rights may be able to view messages from selective users in the online communication group. The user rights data of a user may depend on the role of the user. For example, the user rights data for a user assigned the admin role may comprise "sharing rights—10," "access rights—10," and "user management rights—10" and the user rights data for a user assigned the member role may comprise "sharing rights—10," "access rights—5," and "user management rights—0."

Further to modifying the user data, the system may link one or more information databases with the online communication group. The one or more information databases may be linked based on the set of users, the user data of the set of users, and the role of the one or more users in the set of users. In an embodiment, the system may link one or more information databases based on the purpose of the online group. In an embodiment, the system may identify relevant information databases for the online communication group based on the set of users, the user data, and the role of the one or more users. In an embodiment, the system may identify one or more information databases linked to the one or more existing communication groups of the set of users. For example, the one or more information databases may include an identity database comprising identities of the set of users. The one or more information databases may be linked to the online communication group using a bridging technique. The bridging technique involves managing an encrypted network bridge. The Network bridges may be configured to provide data from the one or more information databases to the online communication group. For example, an EMR stream may be received from an Electronic Medical Record/Electronic Health Record (EMR/EHR) database, a Customer Relationship Management (CRM) stream may be received from a CRM database, and an Enterprise Resource Planning (ERP) stream may be received from an ERP database. Such above mentioned information databases may be connected with the online communication group and may be used for sending or receiving messages within the online group communication. A few selected messages or all messages can be pushed as notes in the linked one or more information databases.

In an embodiment, the one or more information databases may be accessed by the one or more users in the set of users using a query to retrieve information from the one or more information databases. Further, the information may be retrieved based on the user role and the user rights data. In an embodiment, one or more selective users may be allowed to access the one or more information databases.

In an embodiment, messages sent on the online communication group by the one or more users may be stored in the one or more information databases. In an embodiment, messages may be selectively stored based on the role of the user sending the message.

In an embodiment, the access to the information database may be granted on to a user having a particular role. Consider an example of a personal caretaker for a patient availing care at home services from a hospital. The online communication group for the patient may comprise one or more users. The one or more users may be one or more personal caretakers of the patient appointed by the hospital. The information regarding the patient may be linked to the online communication group and may only be accessed by a personal caretaker having a role "active caretaker." Consider that the user's role may be adjusted from a "passive caretaker" to an "active caretaker" when the user's location is in a radius of the patient's home. Therefore, only the personal caretaker that is near the patient will be given access to information of the patient.

In an embodiment, the online communication group may include one or more users. A role may be assigned to the one or more users. The online communication group may be a broadcast, moderated, or monitored group. A broadcast communication group allows an administrator and/or a manager to control a large body of users without cluttering traffic from such users. The administrator and/or the manager can send messages and see all messages within the broadcast communication group. Individual users can't see memberships or can't send universal messages in the broadcast communication group. Also, the individual users cannot reply in a thread for any incoming message, keeping the context of the messages active. Such replies are not seen by members, and only the administrator and/or the manager can see the replies. Each thread of an incoming message can be viewed independently. A message or reply in a thread can be connected to another message in the thread. Further, users may be allowed to navigate to different threads within the communication group. The threads could be labeled with a title.

In a moderated communication group, the administrator and/or the manager has an authority to block the viewing of certain messages, unlike usual communication groups where only a sender of a message is permitted to delete messages for the entire group only if sent by him/her.

In the moderated communication group, however, the administrator/manager can assign a user sent by a user as 'masked' from viewing by other members. An explanation for masking the message can be associated with the message. It must be understood that upon masking the message is not deleted and remains available for compliance. Such messages can be unmasked for possible viewing at a later stage.

In a monitored communication group, one or more users may be assigned to be responsible for monitoring messages for a stipulated purpose. For example, a communication group associated with managing a patient's therapy could associate a user to be responsible for the information as well as care of the patient. The user may be assigned to continuously monitor messages regarding patient's vitals. This is similar to a monitoring entity supervising a visual monitor array to safeguard a physical premise. Any member can view the status of the communication group to query the monitor.

In an embodiment, a user can request the role of a monitor. Additionally, a scheduling calendar can be associated with the online communication group for making automated decisions about the role of the users in the online communication group. Further, location based geo-fencing capability can be provided in the communication group for automatically assigning roles to the users based on a location of a user vis-à-vis the location associated with the online communication group. The administrator and users can adjust a mechanism of notification when the role of the users is adjusted, such as a new user is assigned, or an existing monitoring user is removed from monitoring role. Notifications are merely used as a convenience, but actual status of monitoring users and activities can be queried by any user belonging to the communication group.

The online communication group may be used for sending messages, mails, locations, fax, and making calls. Details of information exchanged over the online communication group may be stored along with associated metadata. The online communication group may implement data pipes for responding to incoming data via triggers. The data pipes allow capturing of asynchronous events for generation of automated messages including relevant information about an event sent as a message. For example, a communication group associated with dissemination of information about admissions and discharges in a hospital can be configured as a data pipe with connection to an existing communication group. In such cases, when an event is reported via such data pipe, information about the event is converted into a message and sent to the online communication group as if the message was typed by a user of the online communication group. In another situation, a reminder for a calendar event may be sent over the online communication group. Further, a message may be sent over the online communication group when a team schedule identifies a member to be monitoring the online communication group based on a location of the member, and/or time in the organization or online communication group.

Further, agents for support, help, or chatbots may be configured over the online communication group so that required automated assistance could be provided to the users. The online communication group may also be configured to allow automatic or manual scheduling of meetings between the users. Once scheduled, the users may be able to view details of the meetings.

In one embodiment, a method of managing an online communication group for hospital staff is described. The method comprises selecting a plurality of users to be included in the online communication group. The users may be doctors, patients, nurses, or other members associated with healthcare of patients. An administrator may perform selection of the plurality of users from one or more sources including a contact list and one or more existing communication groups. Additionally, a dynamic rule may be defined for querying a linked information database for checking availability of one or more users who would become part of the online communication group without manually including them into the online communication group. A dynamic rule to fetch a list of users could involve a query for fetching a list of patients currently admitted in an emergency ward. Based on their profile information, such patients will be included in the set of users in the online communication group. It is conceivable that the list of users will vary on a real-time basis depending upon information generation capability of a fetch command.

In an embodiment, a dynamic membership of the online communication group linked to an organization can be determined using the schedule assigned to an organization's team. The schedule identifies timings, dates, and/or days of weeks to assign a role to the users within the organization. When a message is sent in the online communication group, members to whom the message should be sent are determined based on current time and date and information present in the schedule.

In one implementation, a user category, an address, a phone number, a secure email address, a fax link, a telecommunication link, a record of a user from the set of users may be linked to the online communication group via one or more databases. In one implementation, user categories, addresses, phone numbers, secure email addresses, faxes, telecommunication links and records of users from the set of users may be linked with the online communication group for performing actions. The user categories may correspond to at least one of a hierarchy of the users, relationships between the users, and a department of an organization to which a user belongs. The user category may be used for filtering messages displayed to a user. The address of the users may be used for providing location-based services, such as geo-fencing or mapping/routing services within the online communication group. The phone numbers or the email addresses allow for accessing communication possibilities with the users in the group. The records may be used to extract user information such as communication records of the users, queries received from the users, and the like.

Over the online communication group, information may be shared between unique identifiers (caller IDs) assigned to each user and telephone number of each user. The information may be shared as one of chat messages, images, videos, audios, audio-video calls, calendar messages, and poll messages. The online communication group may also include a facility of providing acknowledgement or reading receipts of received messages.

A unique email address may be assigned to the online communication group, based on a request of the administrator. For example, the email address assigned to the online communication group may be "buzz.xyzabc@secure.buzz." Emails or other messages, such as text or HTML messages could be sent to such email addresses. When an email is sent to the email address, the email may be converted into a message and sent on the online communication group. Further, the email converted into the message may be sent in an encrypted format. A user present in the online communication group may reply to participants of the email or invite the non-users to join the online communication group.

Over the online communication group, a user may create a poll message to compile responses of other users towards a poll event, for example responses towards a question asked through the message. A dynamic status of the poll event and attendees of a calendar event may be shared within the online communication group.

The online communication group may also include voice recognition and voice to text conversion capabilities. The online communication group may also provide an option to edit a message. Details associated with editing the message may also be shared over the online communication group. The details may include a timestamp and an identity of the user who edited the message, and a history of all versions of edited messages in a chronological sequence.

In one implementation, different teams could be defined within the organization that uses one or more online communication groups, and each team may include one or more users. Such a team can be used as a short-hand method to identify one or more members of a team to manage special indication in a given message. Further, some users may be tagged within multiple teams within the online communication group, as per requirement. When a message is sent to a team, the message shown to the users of the teams will include details of the team and username by whom the message was shared. For example, a team may include all members of an organization that belong to scheduling or sales profile. When a group conversation contains a message referencing to a team, it is assumed that a specific reference is made to all members of the online communication group that belong to the team.

All information exchanged over the online communication group is strictly stored in an encrypted format within one or more central servers hosting the online communication group. Further, access to such one or more central servers is strictly restricted and controlled through security policies and unique encryption techniques. This would prevent information breaches and keep the information secure. The information is uniquely encrypted for each user of the communication group. Specifically, cascading encryption is performed for newly added users. The information stored at the server in an encrypted format can only be decrypted by the administrator and not any other user. In this manner, the server holds zero knowledge therefore, privacy and security of users isn't compromised.

In one implementation, the user may have an option to enable an auto sense mode for using the online communication group. The auto sense mode may sense user modes in which the user is accessing the online communication group and accordingly change operational conditions of the online communication group. The different modes may include accessing the online communication group while driving a vehicle, accessing the online communication group over a desktop browser, and accessing the online communication group over a mobile application. The operational conditions may include a theme, font size, and screen contrast and resolution, notification styles and interaction layouts such as buttons.

Post the creation of the online communication group, new users could be added. Further, an administrator of the communication group or members designated as managers may enable sharing of information previously shared over the online communication group with the new users after they are added to the online communication group. The information may be shared with the new users in a selective manner, to include all messages or a subset of messages shared after a certain date and/or time. An administrator of the online communication group may define which type or which portion of the information is required to be shared with the new users.

In one implementation, a current location of a user may be determined using a location determining service, such as Global Positioning Service (GPS) installed on his smartphone. In another implementation, the location of a user may be determined using Cellular Network Triangulation, or through Wi-Fi Positioning.

In one implementation, one or more alerts may be configured based on location of the user and user mode of one or more users in the set of users in an online communication group. The alerts may be shared with the admin. For example, in the online communication group for patient care, an alert me be configured based on the location of the patient who is a user in the online communication group. The alert may be shared with a doctor who is an admin in the online communication group when the location of the patient is detected outside a set of location coordinates.

Figure 2:
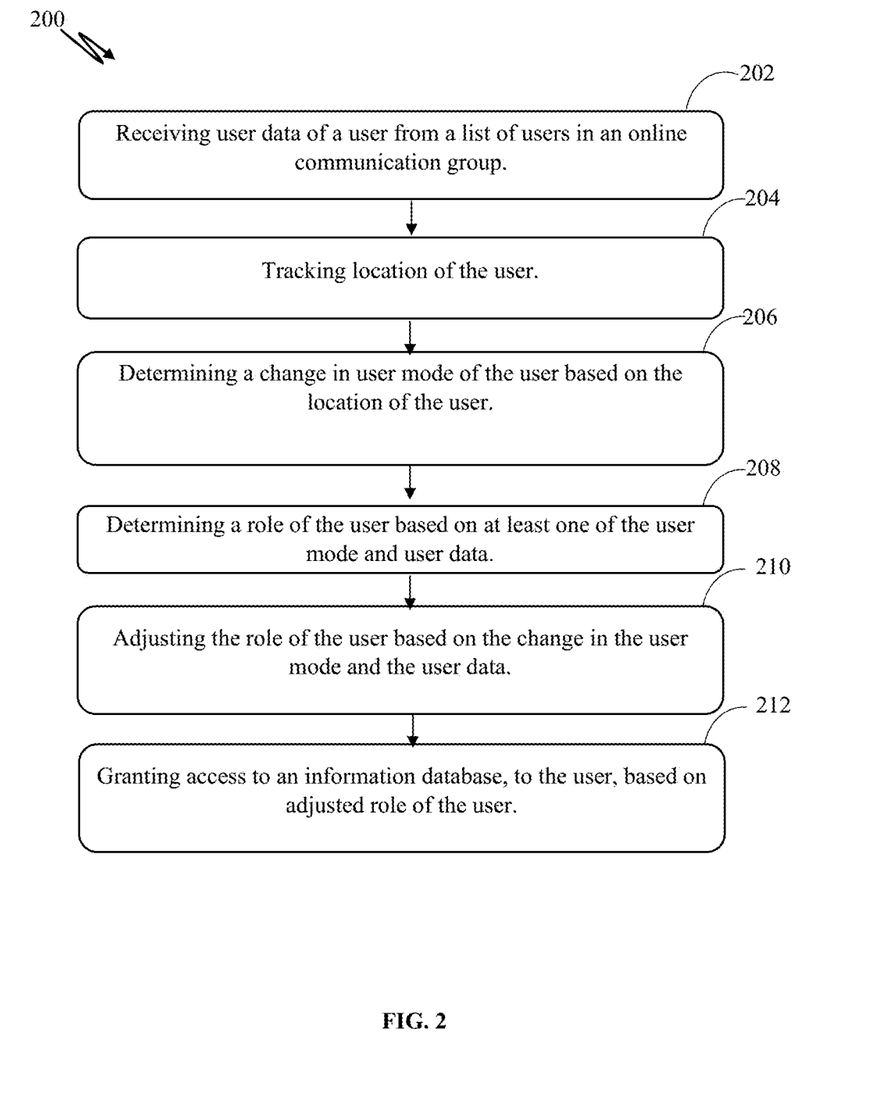
FIG. 2 illustrates a flow chart of a method of managing an online communication group, in accordance with an embodiment of the present subject matter.

Referring now to FIG. 2, a method 200 for managing an online communication group is shown, in accordance with an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The order in which the method 200 is described is not intended to be construed as a limitation, and any number of the described method blocks can be combined in any order to implement the method 200 or alternate methods for managing an online communication group. Furthermore, the method 200 for managing an online communication group can be implemented in any suitable hardware, software, firmware, or combination thereof. However, for ease of explanation, in the embodiments described below, the method 200 may be considered to be implemented in the above-described system 102.

At block 202, user data of a user from a list of users in the online communication group is received.

At block 204, location of the user is tracked using at least one of Global Positioning Service (GPS), Cellular Network Triangulation, and Wireless Fidelity (Wi-Fi) Positioning.

At block 206, a change in user mode is determined based on the location of the user.

At block 208, a role of the user is determined based on at least one of the user mode and the user data.

At block 210, the role of the user is adjusted based on the change in user mode and the user data.

At block 212, the user may be granted access to an information database linked to the online communication group based on adjusted role of the user.

Although implementations for methods and systems for managing an online communication group have been described in language specific to structural features and/or methods, it is to be understood that the appended claims are not necessarily limited to the specific features or methods described. Rather, the specific features and methods are disclosed as examples of implementations for managing an online communication group.

Figure 3:
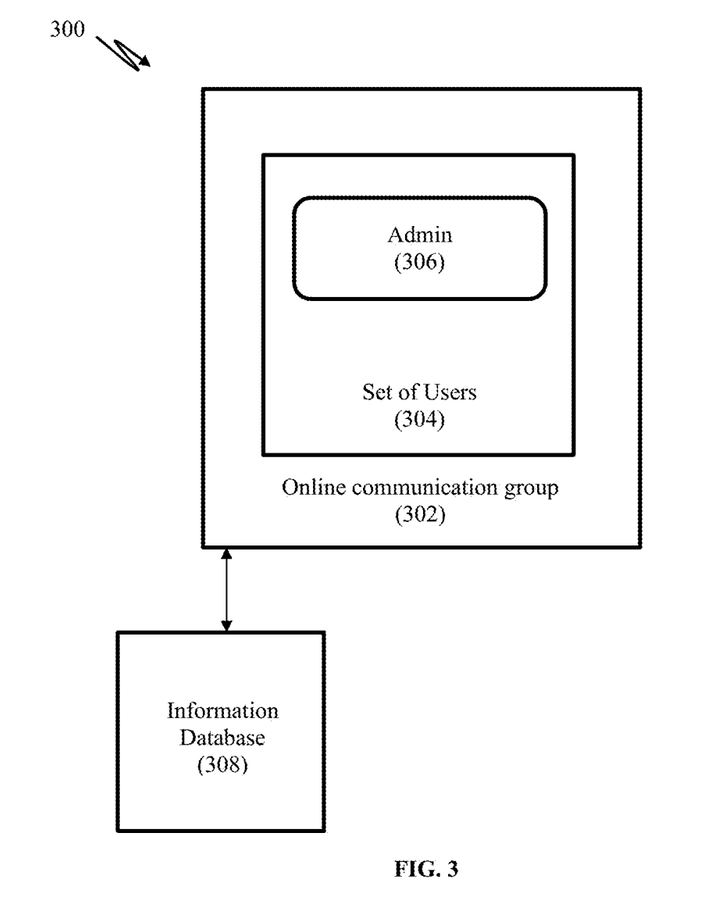
FIG. 3 illustrates a block diagram of an online communication group, in accordance with an embodiment of the present subject matter.

Referring now to FIG. 3, an example 300 of an online communication group 302 is illustrated. The online communication group 302 comprises a set of users 304. The set of users may comprise one or more users. The set of users comprises an admin 306. The admin may be a user from the set of users or an automated admin system. Further, an information database 308 is linked to the online communication group 302. The information database is linked for sending and receiving information to and from the online communication group 302.

Exemplary embodiments discussed above may provide certain advantages. Though not required to practice aspects of the disclosure, these advantages may include the following.

Some embodiments of the system and the method may increase efficiency in making communication channels between employees of an organization.

Some embodiments of the system and the method may automate management of communication channels thus reducing manpower required for monitoring and managing communication channels.

Although implementations for methods and system for managing an online communication group have been described in language specific to structural features and/or methods, it is to be understood that the appended claims are not necessarily limited to the specific features or methods described. Rather, the specific features and methods are disclosed as examples of implementations for managing an online communication group.

The invention claimed is:

1. A method for managing an online communication group, the method comprising:
   receiving, by a processor, user data of a user from a list of users in the online communication group, wherein the user data comprises one or more existing communication groups, and user rights data from the one or more existing communication groups of the user;
   tracking, by the processor, a location of the user;
   determining, by the processor, a change in user mode of the user based on the location of the user;
   determining, by the processor, a role, in the online communication group, of the user based on at least one of the user mode and the user data, wherein the role of the user is specific to the online communication group, and wherein the role of the user is one of a monitor, a manager, an admin, a member, and a non-member;
   executing, by the processor, a machine-learning model trained on historic data comprising user-mode, user-data, and role for a plurality of online communication groups to adjust the role of the user based on the change in the user mode and the user data; and
   granting, by the processor, access to an information database, to the user, based on an adjusted role of the user, wherein the information database is linked to the online communication group, and wherein granting access comprises updating the user-rights data of the user in real-time to reflect the adjusted role and synchronising the updated user-rights data with the linked information database.

2. The method as claimed in claim 1, wherein the location of the user is tracked using at least one of Global Positioning Service (GPS), Cellular Network Triangulation, and Wireless Fidelity (Wi-Fi) Positioning.

3. The method as claimed in claim 1, wherein granting access to the information database comprises enabling the user for receiving information from the one or more information databases for a query sent as a message on the online communication group.

4. The method as claimed in claim 1, wherein the list of users comprises users from an organization, and wherein a user from the list of users is removed from the online communication group when the user is removed from the organization.

5. The method as claimed in claim 4, wherein the one or more existing communication groups correspond to other online communication groups that the user is a part of, wherein the other online communication groups are at least one of internal communication groups of the organization, external communication groups on external communication channels, and an official communication channel of the organization.

6. The method as claimed in claim 1, wherein the information database is linked to the online communication group, and wherein the information database comprises at least one of a category, an address, a phone number, an email address, and a record of the user, and wherein the information database is used for performing an action.

7. The method as claimed in claim 6, wherein the action comprises at least one of filtering one or more messages displayed to the one or more users based on the category of the user, navigating a user to the address of another user, starting a call between one or more users, adding one or more users to a calendar event, extracting user information from the record of a user.

8. The method as claimed in claim 1, wherein the role of the user is adjusted using a machine learning algorithm, and wherein the machine learning algorithm is trained to adjust the role of the user based on the change in the user mode.

9. The method as claimed in claim 8, wherein the machine learning algorithm is trained using a training dataset comprising a plurality of users from a plurality of online communication groups, user data corresponding to the plurality of users, a plurality of changes in the user mode of the plurality of users, and corresponding adjusted roles of the plurality of users.

10. The method as claimed in claim 1, wherein the user rights data comprises at least one of access rights, user management rights, and sharing rights of a user in the one or more existing communication groups.

11. The method as claimed in claim 1, wherein the user mode corresponds to a status of the user, and wherein the status of the user may be one of a predetermined set of statuses of the users in the online communication group.

12. The method as claimed in claim 1, wherein the user is granted access to the information database by updating the user rights data based on the adjusted role of the user.

13. A system for managing an online communication group, comprising:
   a memory configured to store programmed instructions; and
   a processor, operatively coupled to the memory, configured to execute the programmed instructions for:
     receiving user data of a user from a list of users in the online communication group, wherein the user data comprises one or more existing communication groups, and user rights data from the one or more existing communication groups of the user;
     tracking location of the user;
     determining a change in user mode of the user based on the location of the user;
     determining a role, in the online communication group, of the user based on at least one of the user mode and the user data, wherein the role of the user is specific to the online communication group, and wherein the role of the user is one of a monitor, a manager, an admin, a member, and a non-member;
     executing a machine-learning model trained on historic data comprising user-mode, user-data, role for a plurality of online communication groups to adjust the role of the user based on the change in the user mode and the user data; and
     granting access to an information database, to the user, based on an adjusted role of the user, wherein the information database is linked to the online communication group, and wherein granting access comprises updating the user-rights data of the user in real-time to reflect the adjusted role and synchronising the updated user-rights data with the linked information database.

14. A non-transitory computer program product having embodied thereon a computer program for managing an online communication group, the computer program product storing instructions for:
   receiving user data of a user from a list of users in the online communication group, wherein the user data comprises one or more existing communication groups, and user rights data from the one or more existing communication groups of the user;
   tracking location of the user;
   determining a change in user mode of the user based on the location of the user;
   determining a role, in the online communication group, of the user based on at least one of the user mode and the user data, wherein the role of the user is specific to the online communication group, and wherein the role of the user is one of a monitor, a manager, an admin, a member, and a non-member;
   executing a machine-learning model trained on historic data comprising user-mode, user-data, role for a plurality of online communication groups to adjust the role of the user based on the change in the user mode and the user data; and
   granting access to an information database, to the user, based on an adjusted role of the user, wherein the information database is linked to the online communication group, and wherein granting access comprises updating the user-rights data of the user in real-time to reflect the adjusted role and synchronising the updated user-rights data with the linked information database.

* * * * *